(12) United States Patent
Klitsner et al.

(10) Patent No.: US 7,044,857 B1
(45) Date of Patent: May 16, 2006

(54) HAND-HELD MUSICAL GAME

(75) Inventors: Daniel B. Klitsner, Larkspur, CA (US); Brian Clemens, San Francisco, CA (US); Gary Levenberg, San Francisco, CA (US)

(73) Assignee: Klitsner Industrial Design, LLC, San Francisco, CA (US)

( * ) Notice: Subject to any disclaimer, the term of this patent is extended or adjusted under 35 U.S.C. 154(b) by 598 days.

(21) Appl. No.: 10/270,182

(22) Filed: Oct. 15, 2002

(51) Int. Cl.
*A63F 13/00* (2006.01)

(52) U.S. Cl. ........................................ 463/35
(58) Field of Classification Search ............... 463/31, 463/35
See application file for complete search history.

(56) References Cited

U.S. PATENT DOCUMENTS

| | | | |
|---|---|---|---|
| 4,794,838 A * | 1/1989 | Corrigau, III | 84/600 |
| 5,095,799 A | 3/1992 | Wallace et al. | |
| 5,121,668 A | 6/1992 | Segan et al. | |
| 5,166,463 A | 11/1992 | Weber | |
| 5,373,768 A | 12/1994 | Sciortino | |
| 5,540,608 A | 7/1996 | Goldfarb | |
| 5,670,729 A | 9/1997 | Miller et al. | |
| 5,744,744 A | 4/1998 | Wakuda | |
| 5,889,224 A | 3/1999 | Tanaka | |
| 5,893,798 A | 4/1999 | Stambolic et al. | |
| 6,034,308 A * | 3/2000 | Little | 84/291 |
| 6,086,478 A | 7/2000 | Klitsner et al. | |
| 6,210,278 B1 * | 4/2001 | Klitsner | 463/35 |
| 6,225,544 B1 | 5/2001 | Sciortino | |
| 6,225,547 B1 | 5/2001 | Toyama et al. | |
| 6,274,800 B1 | 8/2001 | Gardner | |
| 6,342,665 B1 | 1/2002 | Okita et al. | |
| 2001/0046895 A1 | 11/2001 | Kondo et al. | |

* cited by examiner

*Primary Examiner*—Kim Nguyen
(74) *Attorney, Agent, or Firm*—Fish & Richardson P.C.

(57) ABSTRACT

Described is a hand-held musical game apparatus that is adapted to resemble a guitar, and that operates in a manner that facilitates a game played with it. Generally, the apparatus has a housing shaped to resemble a guitar with a body portion and a neck portion. The neck portion is rotatably connected to the body portion and the body portion has a strum bar. A slide element is slidably connected to the neck portion. Electronics are disposed within the housing to provide, as part of the game, audio and/or visual instructions to rotate the neck, slide the slide element, or strum the strum bar. The game entails a player rotating the neck, sliding the slide element, or strumming the strum bar in accordance with the instructions.

34 Claims, 6 Drawing Sheets

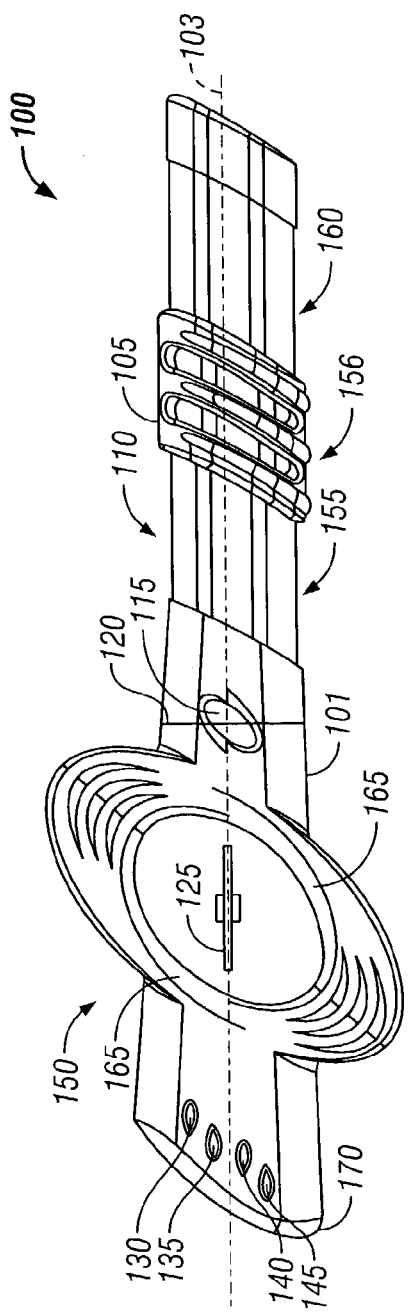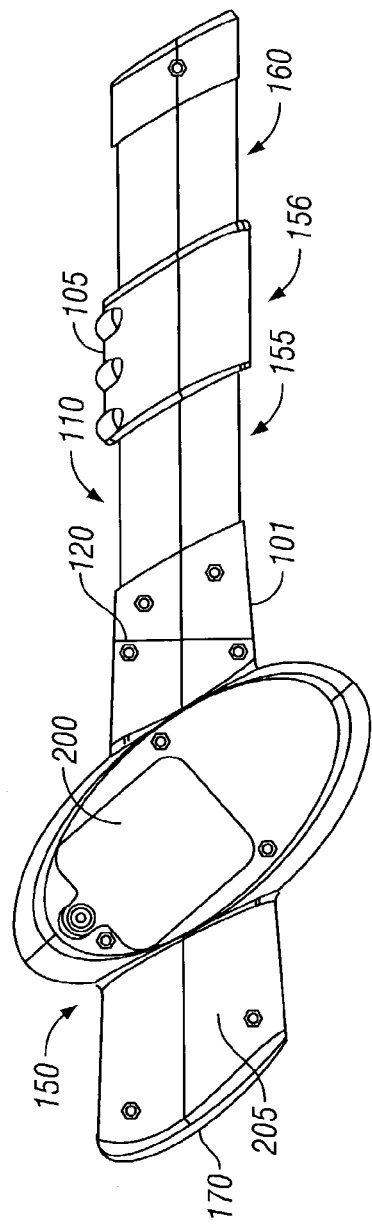

HAND-HELD MUSICAL GAME

TECHNICAL FIELD

This description relates to games, and more particularly to a hand-held musical game that is manipulated in response to visual and/or audio instructions issued by the game.

BACKGROUND

Musical games and toys are well known. These include electronic toys, such as toys that resemble guitars and have stored sound files that are transmitted by a microcontroller through a speaker to produce sounds that resemble those made by a guitar.

SUMMARY

In one general aspect, a game apparatus includes a housing having a body portion and a neck portion. The neck portion is rotatably connected to the body portion and the body portion has a strum bar. A slide element is slidably connected to the neck portion. Electronics are disposed within the housing to provide, as part of a game, audio and/or visual instructions to rotate the neck, slide the slide element, or strum the strum bar. The game entails a player rotating the neck, sliding the slide element, or strumming the strum bar in accordance with the instructions.

The game apparatus may operate to facilitate the game played with the apparatus by providing, as part of the game, an audio and/or visual instruction to rotate the neck, slide the slide element, or strum the strum bar. The electronics determine whether a player has rotated the neck, slid the slide element, or strummed the strum bar in accordance with the instructions.

Using the game apparatus may include receiving from the apparatus, as part of the game, an audio and/or visual instruction to rotate the neck, slide the slide element, or strum the strum bar, and rotating the neck, sliding the slide element, or strumming the strum bar in accordance with the instructions.

The details of one or more implementations are set forth in the accompanying drawings and the description below. Other features will be apparent from the description and drawings, and from the claims.

DESCRIPTION OF DRAWINGS

FIGS. 1 and 2 illustrate front and rear views, respectively, of an implementation of a hand-held musical game apparatus.

Like reference symbols in the various drawings indicate like elements.

DETAILED DESCRIPTION

Figure 3:
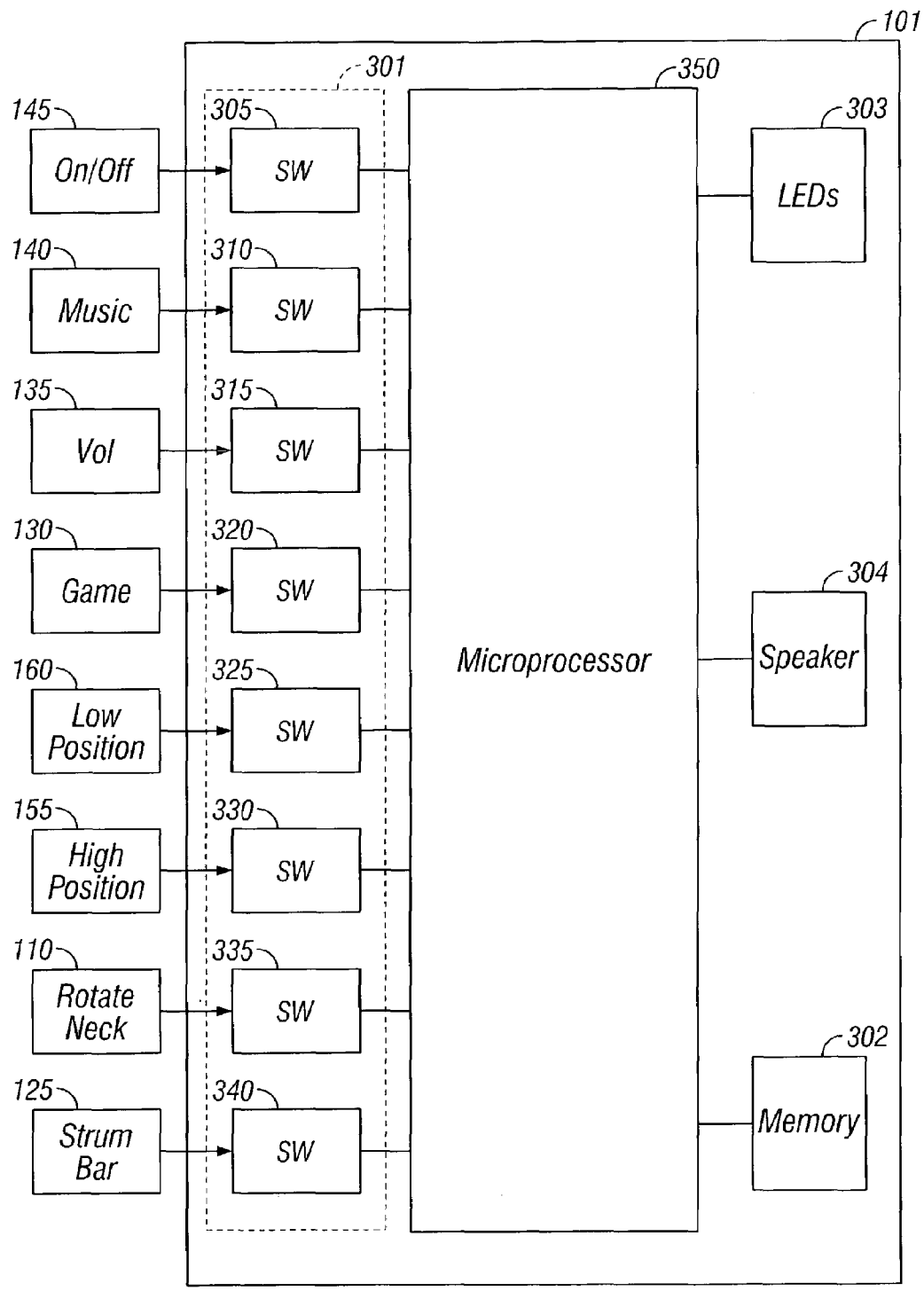
FIG. 3 shows a block diagram for an implementation of the electronic components contained in the housing of the hand-held musical game apparatus of FIGS. 1 and 2.

FIGS. 1 and 2 illustrate front and rear views, respectively, of an implementation of a hand-held musical game apparatus. The hand-held musical game apparatus 100 is adapted to resemble a guitar, and operates in a manner that facilitates a game played with the apparatus 100. Generally, the game is played by manipulating the game apparatus 100 in response to instructions issued by the game apparatus. In one implementation, apparatus 100 plays a musical backbeat during game play, and accompanies the musical backbeat with the instructions in the form of musical sounds and/or lights that indicate to the player what manipulations are to be performed.

Game apparatus 100 has a housing 101 that is shaped to resemble a guitar with a neck portion 110 and a body portion 150. Neck portion 110 and body portion 150 are connected at a junction 120 such that a player can rotate neck portion 110 around a centerline 103. Neck 110 can be rotated, for example, approximately 50 degrees in either direction. Body 150 includes a strum bar 125 that is generally located centrally on body 150. Strum bar 125 can be "strummed" by a player manipulating it either up or down in a direction perpendicular to centerline 103. Body 150 also includes an audio jack 170 to permit the use of headphones, and four push buttons: game select 130, volume 135, music style 140, and on/off 145.

Game select push button 130 permits a player to step through and select one of multiple game formats. The volume push button 135 permits a player to select the volume level (e.g. maximum, medium, or minimum). The music style push button 140 permits a player to select between styles of music (e.g. alternative rock and rhythm and blues). The on/off push button 145 permits a player to turn the game apparatus 100 on or off.

As shown in FIG. 2, a battery compartment may be accessed by removing a battery compartment cover 200. Also, a reset button 205 may be used to reset game apparatus 100 so as to clear out any scores or settings.

A slide element 105 is slidably attached to neck 110. Slide element 105 can be slid by a player into any one of three positions on neck 110: a high position 155 in which element 105 is close to body 150; a low position 160 in which element 105 is close to the end of neck 110 that is opposite body 150; and a middle position 156 between the high and low positions 155, 160. Slide element 105 is attached such that middle position 156 is a default position. That is, when no force is applied to move element 105 to the high or low positions 155, 160, element 105 automatically slides back to middle position 156. Generally, slightly increasing resistance is encountered as a player slides element 105 to either the high position 160 or the low position 155.

Thus, a player can manipulate a number of components of apparatus 100 during play. The player may slide the element 105 upwards or downwards along neck 110. The player may also rotate neck 110 around centerline 103. The player may also move strum bar 125 up or down.

Housing 101 and slide element 105 may be made of a durable, safe, and inexpensively fabricated material, such as plastic. LEDs are contained within housing 101 at the high and low positions 150, 160, a transition point 115 between neck 110 and body 150, and at a strum indicator portion 165 of body 150. The front side of neck 155 is transparent, as well as a part of the housing at transition point 115 and strum indicator portion 165, so that the LEDs can be seen when they are lit.

Housing 101 contains electronics, in addition to the LEDs, that operate in accordance with the game. As described above, the game generally entails apparatus 100 issuing visual or audio instructions to a player. These instructions correspond to ways in which apparatus 100 is to be manipulated. For example, when the instructions are implemented in the form of lights and musical sounds, lighting the LED(s) located at high position 155 and sounding a particular note corresponds to positioning slide element 105 in high position 155. The player must then manipulate apparatus 100 in accordance with the instructions.

A number of different game formats can be used. Some examples include a jam format, a group jam format, or a rhythm jam format. In a jam format, the player is given an instruction for one manipulation each turn, which the player must perform within a predetermined time to gain a point. Like the jam format, the group jam entails a player being given an instruction for one manipulation each turn, which the player must perform. In group jam, however, apparatus 100 indicates that the player should "pass it" after a random number of turns. At this point, the player passes apparatus 100 to another player, who is then provided with instructions for one manipulation each turn. In the rhythm jam format, apparatus 100 issues instructions each turn for a sequence of manipulations that fit melodically within one measure of the musical backbeat. The player must then remember the sequence of manipulations, and perform them within the next measure. For the jam and rhythm jam formats, the player's score is determined at the end of game play based on the number of manipulations that were correctly performed within their time period. Group jam, on the other hand, is a game of elimination with no points. In addition to the game formats, a free jam format can also be used. A free jam format allows the player to manipulate apparatus 100 at-will, accompanied by the backbeat, without any instructions being issued. Each manipulation causes lights and/or musical sounds to be produced by apparatus 100.

FIG. 3 shows a block diagram of an implementation of the electronic components contained in housing 101. The electronics generally include a microprocessor 350 that is connected to memory 302, switches 301, LEDs 303 and speaker 304. Memory 302 stores instructions in the form of a program that is executable by microprocessor 350. The program causes microprocessor 350 to control LEDs 303 and speaker 304 in response to input from switches 301, and in accordance with the game. Memory 302 also stores data (e.g., sound files) relating to voice instructions, musical backbeat, and musical sounds or prompts that are generated during game play.

When on/off push button 145 is pressed, on/off switch 305 is actuated, which in turn sends a signal to microprocessor 350. Similarly, when the player presses game select push button 130, volume push button 135, or music style push button 140, the corresponding switches, game switch 320, volume switch 315, and music switch 310, are actuated, and signals are sent to microprocessor 350.

When a player slides the element 105 upwards along neck 110 to low position 160, low switch 325 is actuated, which sends a signal to microprocessor 350. Conversely, when a player slides the element 105 downwards along neck 110 to high position 155, high switch 330 is actuated, which sends a signal to microprocessor 350. When the player rotates neck 110, rotate switch 335 is actuated, sending a signal to microprocessor 350. Likewise, when the player moves strum bar 125 up or down, strum switch 340 is actuated, sending a signal to microprocessor 350. If the player presses reset button 205, then the reset switch (not shown) is actuated, sending a signal to the game controller 350.

As described, microprocessor 350 controls LEDs 303 and speaker 304 in response to input from switches 301, and in accordance with the game. Thus, microprocessor generally causes apparatus 100 to issue the visual and/or audio instructions to a player by flashing one of the LEDs 303, outputting sounds through speaker 304, or a combination of both. When a player manipulates apparatus 100 by sliding element 105, rotating neck 110, or strumming strum bar 125, microprocessor 350 receives the actuation signals when switches 325, 330, 335, or 340 are actuated as a result. Microprocessor 350 then determines whether any received actuation signals correspond to one ore more correct manipulations. If the player has performed the correct manipulation, microprocessor 350 selects one or more other manipulations at random and causes the appropriate instructions to be issued by LEDs 303 or speaker 304. If the player has not performed the correct manipulations, processor 350 causes an error signal to be output by speaker 304.

Figure 4:
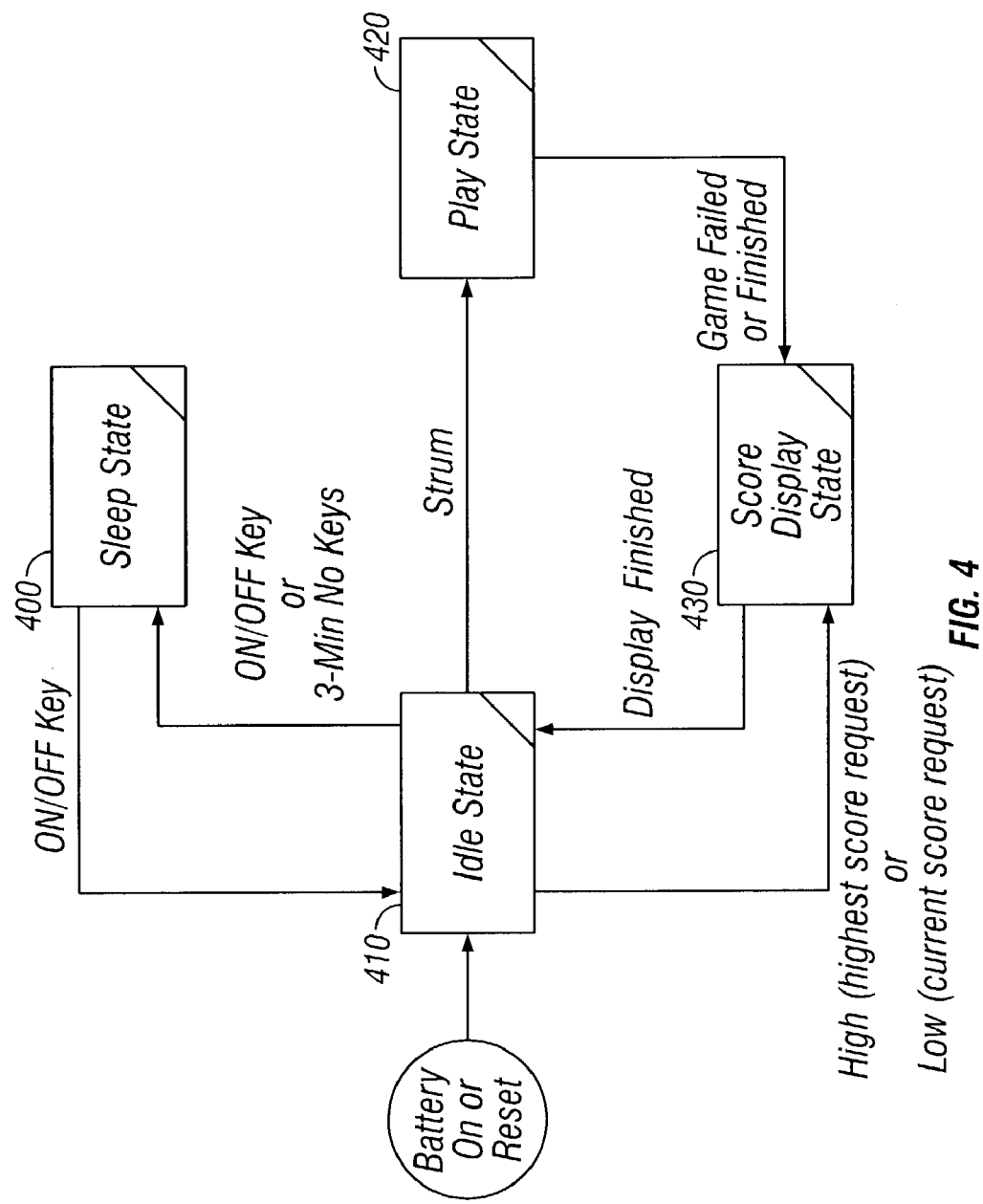
FIG. 4 illustrates an implementation of the state transitions for the microprocessor shown in FIG. 3.

FIG. 4 illustrates an implementation of the state transitions for microprocessor 350. Microprocessor 350 may be in one of four states: Sleep State 400, Idle State 410, Play State 420, or Score Display State 430. The quiescent state when apparatus 100 is powered down is Sleep State 400. Microprocessor 350 enters Sleep State 400 from Idle State 410 either after the player presses on/off push button 145, or when none of the switches 301 are actuated for a predetermined period of time (e.g., three minutes). Microprocessor 350 transitions from Sleep State 400 to Idle State 410 when the player presses on/off push button 145.

In Idle State 410, the player may select the type of game, the level of volume, and/or the music style by pressing push buttons 130, 135, or 140. Microprocessor 350 responds to push buttons 130, 135, or 140 being pressed by stepping to the next game option (e.g., free jam, jam, group jam or rhythm jam), volume level (e.g., maximum, medium or minimum) or music style (e.g., alternative rock or rhythm and blues), respectively. In addition to these selections, the player may also select advanced game modes that are typically hidden (i.e., not identified by prompts). For example, advanced game modes are provided in which the LEDs do not light up to prompt the player ("lights out") and in which the tempo is twice the normal rate ("doubletime"). The player may select the lights out mode by rotating neck 110 and maintaining neck 110 in the rotated position while sliding the sliding element 105 to the high position 155. The player may select the double-time mode by rotating neck 110 and maintaining neck 110 in the rotated position while sliding element 105 to low position 160. Another such mode that could be provided is a bonus jam mode, which allows a player to resume a rhythm jam at the point where the player previously failed. The player may select this mode by rotating neck 110 and strumming strum bar 125.

Once the player has selected the desired options, a player may cause microprocessor 350 to transition to the Play State 420 by moving the strum bar 125 either up or down. The player may also request the current score or the highest score, which causes the microprocessor 350 to transition to the Score Display State 430 from the Idle State 410. This is accomplished by sliding element 105 to the high position 155 to request the highest score display or by sliding element 105 to the low position 160 to request display of the current score.

Microprocessor 350 may also transition to the Score Display State 430 from the Play State 420. This occurs either when the player has completed a game or when the player has erroneously responded to the instructions provided by the apparatus 100. The player's score is displayed, for instance, by blinking a combination of LEDs 303 (e.g., blink the LED at low position 160 once for every hundred points, then blink the LED at high position 155 once for every ten points, and finally blink the LED at transition 115 once for every one point). Once the apparatus 100 has displayed or announced the player's score, microprocessor 350 transitions from the Score Display State 430 to the Idle State 410.

Figure 5A:
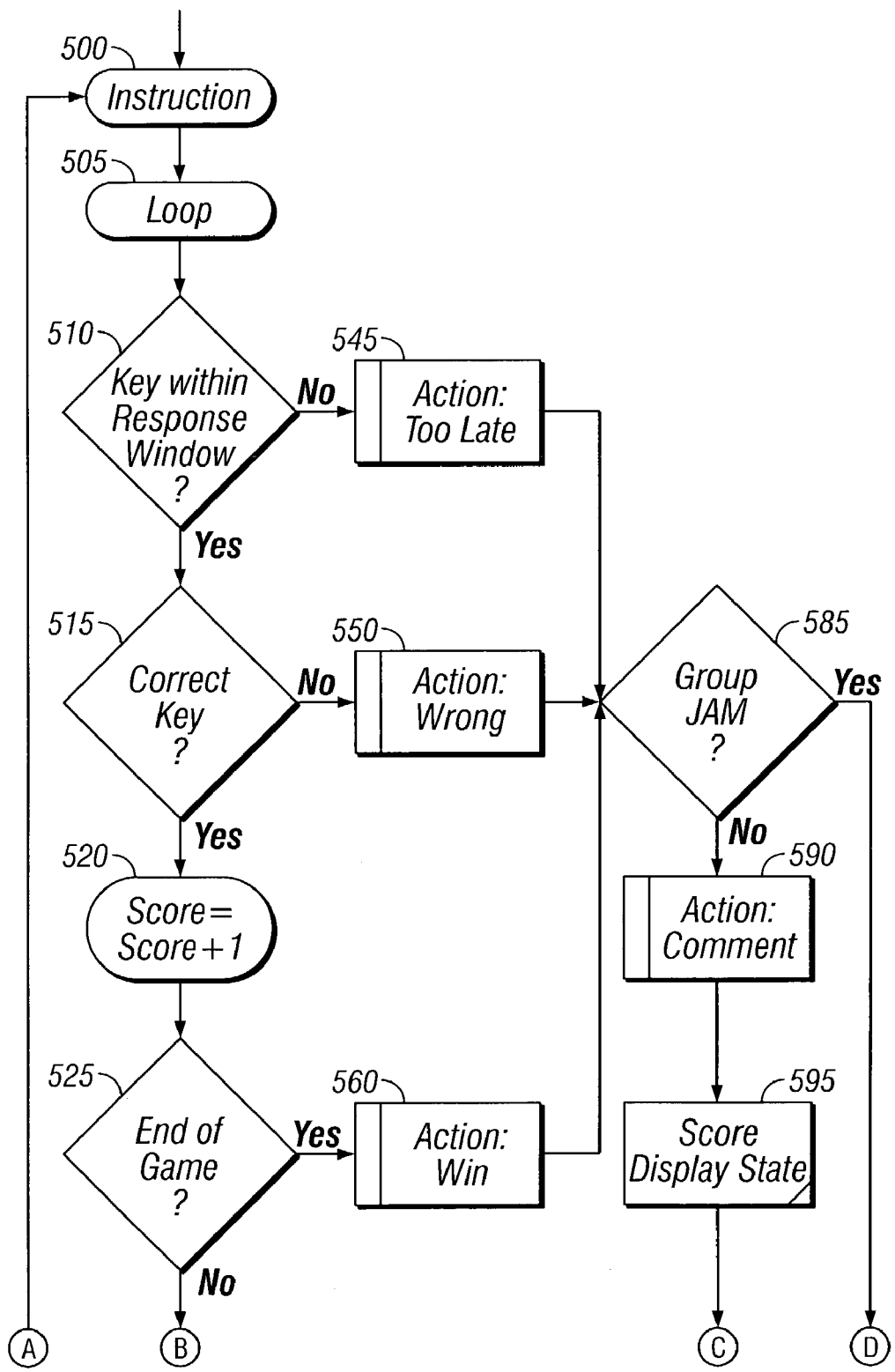
FIG. 5 illustrates an exemplary process performed by the microprocessor shown in FIG. 3 when either the jam or group jam game format is supported and chosen.
Figure 5B:
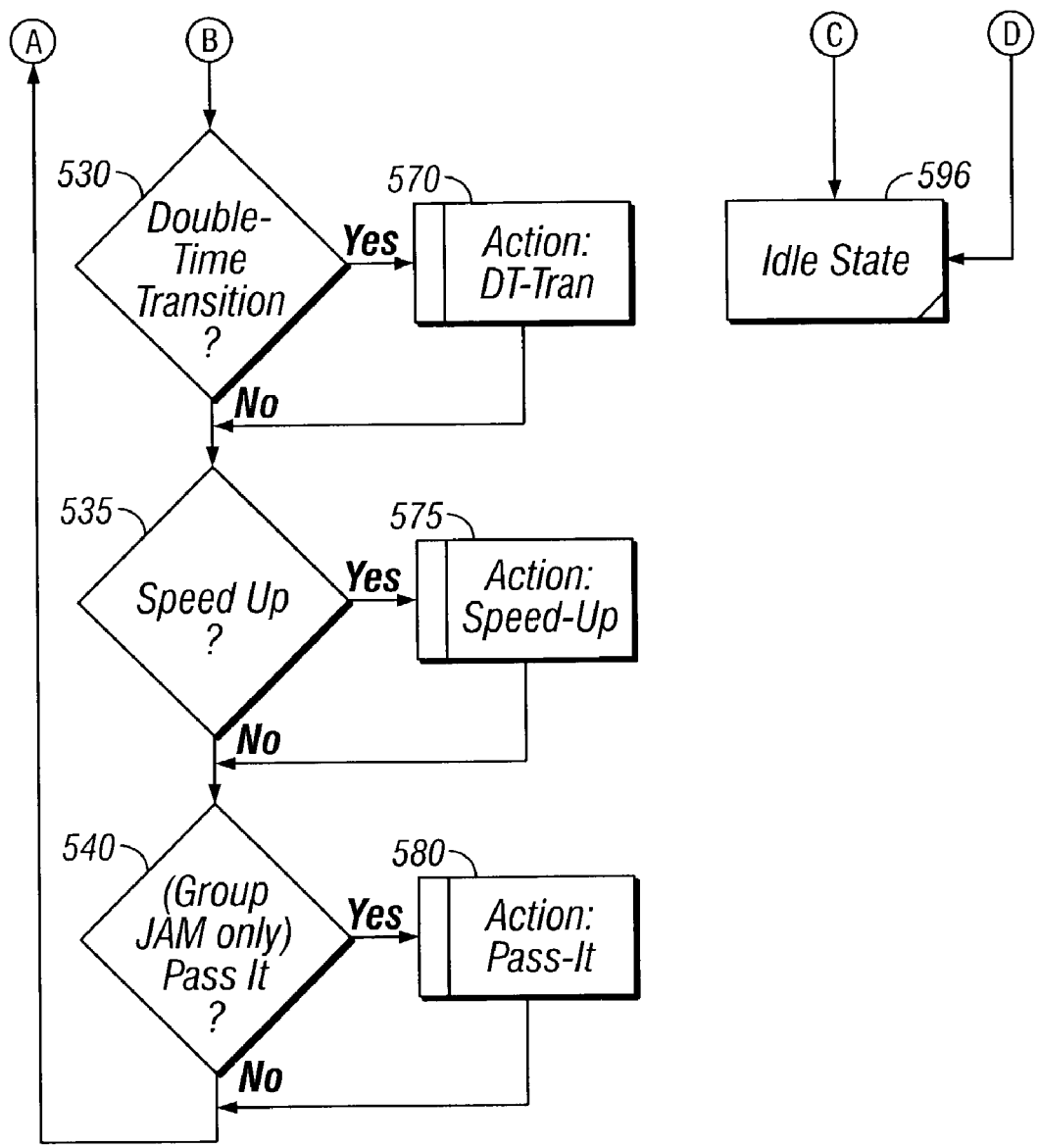

FIG. 5 illustrates an exemplary process performed by microprocessor 350 when either the jam or group jam game format is supported and chosen. Initially, microprocessor 350 causes a visual and/or musical instruction (step 500) to be issued and enters a loop that permits the player to respond (step 505). Microprocessor 350 then determines whether the player performed a manipulation in a timely (step 510) and correct (step 515) manner.

If the player's manipulation is both in time (step 510) and correct (step 515), then microprocessor 350 increases the player's score (step 520).

Microprocessor 350 then determines whether the end of the game has been reached (step 525) by, for example, the player achieving a maximum number of points (e.g., 300). If the game is not over (step 525), then microprocessor 350 determines whether to transition to the double-time mode (step 530), in which microprocessor 350 doubles the tempo (step 570) after the player has achieved a particular number of points (e.g., 176). Next, microprocessor 350 determines whether to increase the speed of the music being played (step 535). For example, microprocessor may increase the speed (step 575) each time the player correctly and timely responds to twelve commands. Microprocessor 350 next determines if group jam has been selected (step 540), and, if so, randomly causes speaker 304 to output a sound indicating the player should pass apparatus 100 (step 580). In either case, microprocessor 350 causes a visual and/or musical instruction (step 500) to be issued and enters the loop that permits the player to respond (step 505).

If the player's response time is too long (step 510), the player's manipulation was incorrect (step 515), or the player wins the game (step 525) (e.g., after successfully completing a predetermined number of responses such as 300), then microprocessor 350 causes speaker 304 to respectively output a sound indicating the manipulation was too late, incorrect, or that the game has been won (steps 545, 550, and 560). Microprocessor 350 then determines if group jam has been selected (step 585). If not, microprocessor 350 causes speaker 304 to issue an audible comment based on the player's score (step 590), transitions to Score Display State 430 (step 595) and then to Idle State 410 (step 596). If group jam has been selected, then microprocessor 350 transitions directly to Idle State 410 (step 596).

Figure 6:
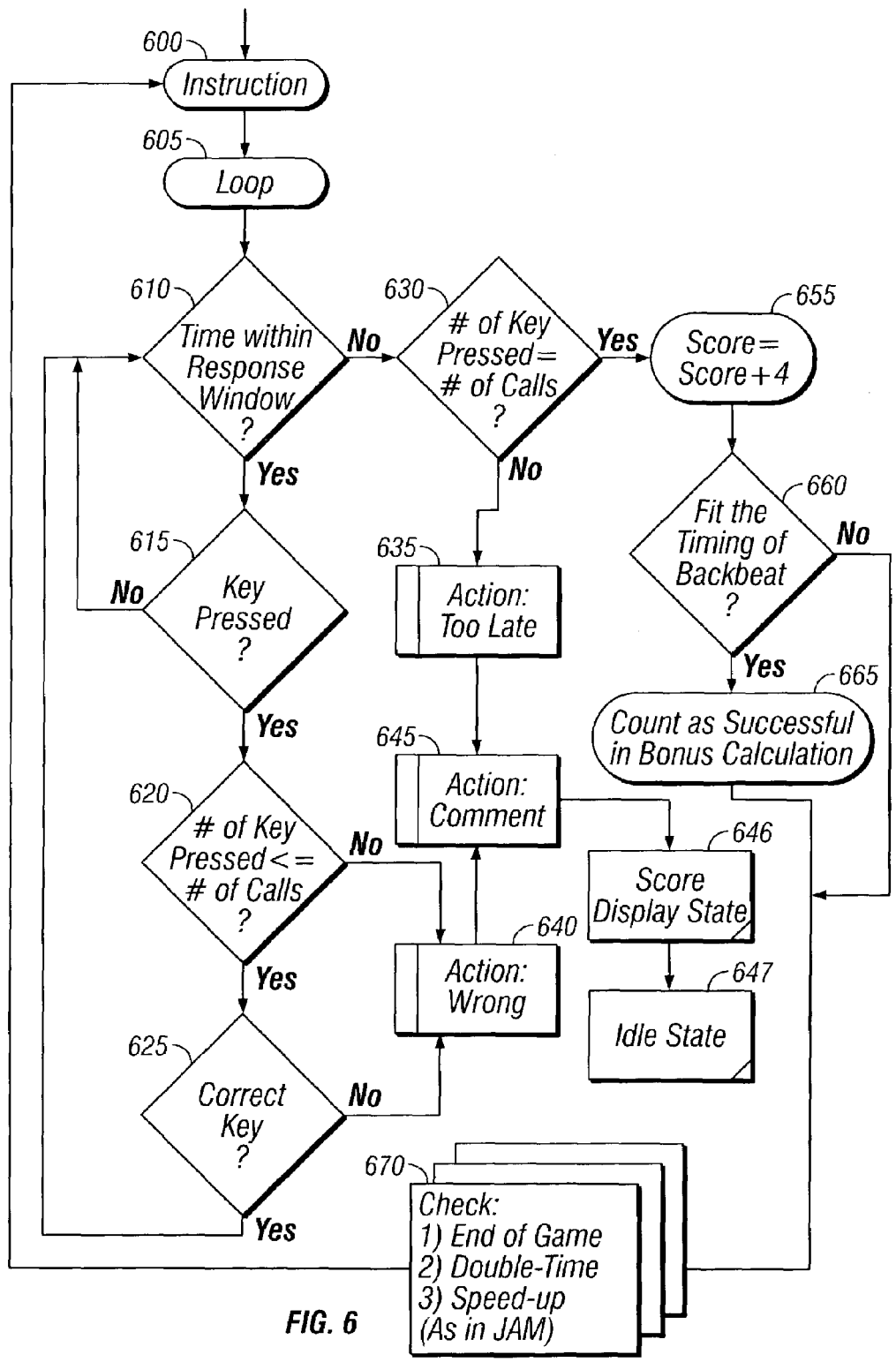
FIG. 6 illustrates an exemplary process performed by the microprocessor shown in FIG. 3 when the rhythm jam game format is supported and chosen.

FIG. 6 illustrates an exemplary process performed by microprocessor 350 when the rhythm jam game format is supported and chosen. Initially, microprocessor 350 causes visual and musical instructions (step 600) to be issued and enters a loop that permits the player to respond (steps 605). The instructions issued in a rhythm jam format indicate that a sequence of manipulations is to be performed. As long as it is still within the predetermined time (step 610), microprocessor 350 waits until a manipulation is performed (step 615). If a manipulation is performed (step 615), and not all of the manipulations have been performed (step 620), microprocessor checks to see if the correct manipulation was performed (step 625). If the manipulation was not correct, or if all of the manipulations have already been performed (hence making the current manipulation erroneous) (step 620), then microprocessor 350 causes speaker 304 to produce a sound indicating the manipulation was wrong (step 640). Microprocessor 350 then causes speaker 304 to issue an audible comment based on the player's score (step 645), transitions to Score Display State 430 (step 646) and then to Idle State 410 (step 647).

If the predetermined time period runs out, and the player has not performed too many or incorrect manipulations, then microprocessor 350 determines whether the player has performed the correct number of manipulations (step 630). If not, then microprocessor 350 causes speaker 304 to produce a sound indicating that all of the manipulations have not been performed in time (step 635). Microprocessor 350 then causes speaker 304 to issue an audible comment based on the player's score (step 645), transitions to Score Display State 430 (step 646) and then to Idle State (step 647).

If all of the manipulations have been performed in time, the player's score is increased (step 655). Then, microprocessor 350 determines whether the manipulations fit the timing of the backbeat (step 660). If so, this is counted towards a bonus calculation (step 665), which is used to determine whether an auditory comment regarding how well the manipulations fit the backbeat will be issued after a number of sequences. The bonus calculation also determines what the comment will be. In either case, microprocessor then determines whether it is the end of the game, double-time, or speed up (step 670), in the same ways as the jam format described in FIG. 5. As long as the end of the game has not been reached, microprocessor 350 again causes visual and/or musical instructions (step 600) to be issued and enters a loop that permits the player to respond (steps 605).

It will be understood that various modifications can be made to the implementations described herein. Accordingly, other implementations are within the scope of the following claims.

What is claimed is:

1. A game apparatus comprising:
    a housing with a body portion and a neck portion, wherein the neck portion is rotatably connected to the body portion and the body portion has a strum bar;
    a slide element slidably connected to the neck portion;
    electronics disposed within the housing to provide, as part of a game, audio instructions, visual instructions, or both audio instructions and visual instructions to rotate the neck, slide the slide element, or strum the strum bar; and
    wherein the game entails a player rotating the neck, sliding the slide element, or strumming the strum bar in accordance with the provided instructions.

2. The apparatus of claim 1 wherein the game has a format in which the player has to perform one rotation, slide, or strum per turn.

3. The apparatus of claim 2 wherein the one rotation, slide, or strum has to be performed within a predetermined period of time.

4. The apparatus of claim 1 wherein the game has a format in which the player has to perform a sequence of rotations, slides, or strums per turn.

5. The apparatus of claim 4 wherein the electronics provide a musical backbeat and the sequence has to be performed within a measure of the backbeat.

6. The apparatus of claim 1 wherein the electronics provide a musical backbeat and the audio instructions are musical sounds.

7. The apparatus of claim 1 wherein the electronics comprise:
    at least one LED located at a high position of the neck;

at least one LED located at a low position of the neck;
at least one LED located at a transition point between the body portion and the neck portion;
at least one LED located at a strum indicator portion of the body; and
wherein LEDs provide the visual instructions.

8. The apparatus of claim 7 wherein the housing is constructed of transparent material at the high position, low position, transition point, and strum indicator portion so that the LEDs can be seen when lit.

9. The apparatus of claim 7 wherein the electronics further comprise:
a speaker;
a microprocessor connected to the speaker and LEDs;
at least one rotation switch connected to the microprocessor, wherein the rotation switch is actuated when the neck is rotated, sending a signal to the microprocessor;
at least one strum switch connected to the microprocessor, wherein the strum switch is actuated when the strum bar is strummed, sending a signal to the microprocessor;
at least one slide switch connected to the microprocessor, wherein the slide switch is actuated when the slide element is slid, sending a signal to the microprocessor; and
wherein the microprocessor controls the speaker and LEDs in response to the signals from the switches, and in accordance with the game.

10. The apparatus of claim 9 wherein the slide element can be slid from a middle position of the neck to either the high position or the low position.

11. The apparatus of claim 10 wherein the at least one slide switch comprises a low slide switch and a high slide switch, the high slide switch being actuated when the slide element is slid to the high position and the low slide switch being actuated when the slide element is slid to the low position.

12. The apparatus of claim 11 wherein the microprocessor provides a musical backbeat via the speaker and the audio instructions are musical sounds provided by the microprocessor via the speaker.

13. A method of operating a game apparatus in a manner that facilitates a game played with the apparatus, wherein the apparatus comprises a neck portion rotatably connected to a body portion having a strum bar, wherein the neck portion has a slide element slidably attached thereto, the method comprising:
providing, as part of the game, an audio instruction, a visual instruction, or both an audio instruction and a visual instruction to rotate the neck, slide the slide element, or strum the strum bar; and
determining whether a player has rotated the neck, slid the slide element, or strummed the strum bar in accordance with the provided instruction or instructions.

14. The method of claim 13 wherein the game has a format in which the player has to perform one rotation, slide, or strum per turn.

15. The method of claim 14 wherein the one rotation, slide, or strum has to be performed within a predetermined period of time.

16. The method of claim 13 wherein the game has a format in which the player has to perform a sequence of rotations, slides, or strums per turn.

17. The method of claim 16 further comprising:
providing a musical backbeat; and
wherein the sequence has to be performed within a measure of the backbeat.

18. The method of claim 13 further comprising:
providing a musical backbeat; and
wherein the audio instructions are musical sounds.

19. The method of claim 13 wherein the apparatus further comprises:
at least one LED located at a high position of the neck;
at least one LED located at a low position of the neck;
at least one LED located at a transition point between the body portion and the neck portion;
at least one LED located at a strum indicator portion of the body; and
wherein LEDs provide the visual instructions.

20. The method of claim 19 wherein the apparatus further comprises:
a speaker;
a microprocessor connected to the speaker and LEDs;
at least one rotation switch connected to the microprocessor, wherein the rotation switch is actuated when the neck is rotated, sending a signal to the microprocessor;
at least one strum switch connected to the microprocessor, wherein the strum switch is actuated when the strum bar is strummed, sending a signal to the microprocessor;
at least one slide switch connected to the microprocessor, wherein the slide switch is actuated when the slide element is slid, sending a signal to the microprocessor; and
wherein the microprocessor controls the speaker and LEDs in response to the signals from the switches, and in accordance with the game.

21. The method of claim 20 wherein the slide element can be slid from a middle position of the neck to either the high position or the low position.

22. The method of claim 21 wherein the at least one slide switch comprises a low slide switch and a high slide switch, the high slide switch being actuated when the slide element is slid to the high position and the low slide switch being actuated when the slide element is slid to the low position.

23. The method of claim 22 wherein the microprocessor provides a musical backbeat via the speaker and the audio instructions are musical sounds provided by the microprocessor via the speaker.

24. A method of using a game apparatus that comprises a neck portion rotatably connected to a body portion having a strum bar, wherein the neck portion has a slide element slidably attached thereto, the method comprising:
receiving from the game apparatus, as part of a game, an audio instruction, a visual instruction, or both an audio instruction and a visual instruction to rotate the neck, slide the slide element, or strum the strum bar; and
rotating the neck, sliding the slide element, or strumming the strum bar in accordance with the received instruction or instructions.

25. The method of claim 24 wherein the game has a format in which a player has to perform one rotation, slide, or strum per turn.

26. The method of claim 25 wherein the one rotation, slide, or strum has to be performed within a predetermined period of time.

27. The method of claim 24 wherein the game has a format in which a player has to perform a sequence of rotations, slides, or strums per turn.

28. The method of claim 27 wherein the apparatus provides a musical backbeat and the sequence has to be performed within a measure of the backbeat.

29. The method of claim 24 wherein the apparatus provides a musical backbeat and the audio instructions are musical sounds.

30. The method of claim 24 wherein the apparatus further comprises:
   at least one LED located at a high position of the neck;
   at least one LED located at a low position of the neck;
   at least one LED located at a transition point between the body portion and the neck portion;
   at least one LED located at a strum indicator portion of the body; and
   wherein LEDs provide the visual instructions.

31. The method of claim 30 wherein the apparatus further comprises:
   a speaker;
   a microprocessor connected to the speaker and LEDs;
   at least one rotation switch connected to the microprocessor, wherein the rotation switch is actuated when the neck is rotated, sending a signal to the microprocessor;
   at least one strum switch connected to the microprocessor, wherein the strum switch is actuated when the strum bar is strummed, sending a signal to the microprocessor;
   at least one slide switch connected to the microprocessor, wherein the slide switch is actuated when the slide element is slid, sending a signal to the microprocessor; and
   wherein the microprocessor controls the speaker and LEDs in response to the signals from the switches, and in accordance with the game.

32. The method of claim 31 wherein the slide element can be slid from a middle position of the neck to either the high position or the low position.

33. The method of claim 32 wherein the at least one slide switch comprises a low slide switch and a high slide switch, the high slide switch being actuated when the slide element is slid to the high position and the low slide switch being actuated when the slide element is slid to the low position.

34. The method of claim 33 wherein the microprocessor provides a musical backbeat via the speaker and the audio instructions are musical sounds provided by the microprocessor via the speaker.

* * * * *